United States Patent
Yigang et al.

(10) Patent No.: US 8,468,267 B2
(45) Date of Patent: Jun. 18, 2013

(54) IMS DIAMETER ROUTER WITH LOAD BALANCING

(75) Inventors: Cai Yigang, Naperville, IL (US); Pei Ke, Beijing (CN); Li Xiang Yang, Beijing (CN)

(73) Assignee: Alcatel Lucent, Paris (FR)

( * ) Notice: Subject to any disclaimer, the term of this patent is extended or adjusted under 35 U.S.C. 154(b) by 215 days.

(21) Appl. No.: 12/744,504

(22) PCT Filed: Dec. 1, 2007

(86) PCT No.: PCT/US2007/086203
§ 371 (c)(1),
(2), (4) Date: Jul. 8, 2010

(87) PCT Pub. No.: WO2009/070179
PCT Pub. Date: Jun. 4, 2009

(65) Prior Publication Data
US 2010/0299451 A1 Nov. 25, 2010

(51) Int. Cl.
*G06F 15/16* (2006.01)
(52) U.S. Cl.
USPC ............................ 709/241; 709/225; 709/219
(58) Field of Classification Search
USPC ......... 709/241, 238–240, 223–226, 201–203, 709/217–219
See application file for complete search history.

(56) References Cited

U.S. PATENT DOCUMENTS

| | | | |
|---|---|---|---|
| 6,298,383 B1 | 10/2001 | Gutman | |
| 6,779,017 B1 * | 8/2004 | Lamberton et al. | 709/203 |
| 6,954,790 B2 | 10/2005 | Forslow | |
| 7,170,982 B2 | 1/2007 | Li et al. | |
| 2003/0023744 A1 * | 1/2003 | Sadot et al. | 709/234 |
| 2003/0217285 A1 | 11/2003 | Sanchez Herrero et al. | |
| 2004/0117493 A1 * | 6/2004 | Bazot et al. | 709/229 |
| 2005/0086541 A1 | 4/2005 | Rajaniemi | |
| 2005/0088971 A1 | 4/2005 | Qing et al. | |
| 2005/0235065 A1 * | 10/2005 | Le et al. | 709/238 |
| 2006/0045250 A1 | 3/2006 | Cai et al. | |
| 2006/0067338 A1 * | 3/2006 | Hua et al. | 370/400 |
| 2006/0077926 A1 * | 4/2006 | Rune | 370/328 |
| 2006/0225128 A1 * | 10/2006 | Aittola et al. | 726/3 |

(Continued)

FOREIGN PATENT DOCUMENTS

CN 1010096319 8/2007

OTHER PUBLICATIONS

P. Calhoun, J. Loughty, E. Guttman, G. Zorn, and J. Arkko, "RFC 3588".
International Search Report, PCT/ISA/210, Apr. 2005.

(Continued)

*Primary Examiner* — Ruolei Zong
(74) *Attorney, Agent, or Firm* — Fay Sharpe LLP

(57) ABSTRACT

A Diameter router is presented for performing load balancing and initial Diameter message routing in an IMS network, where clients in network elements are provisioned with the address of the router and send an initial Diameter request message for a given session to the router. The router selects a server based at least partially on a type of IMS message session, application services, subscriber information, or billing information, and sends a relayed initial Diameter request message to the selected server. The selected server sends an initial Diameter response to the router which then forwards a relayed initial response to the client. Thereafter, the client and the selected server send messages directly to each other for the remainder of the session.

28 Claims, 4 Drawing Sheets

U.S. PATENT DOCUMENTS

| | | | |
|---|---|---|---|
| 2007/0180113 A1* | 8/2007 | Van Bemmel | 709/226 |
| 2007/0207818 A1 | 9/2007 | Rosenberg et al. | |
| 2008/0039104 A1* | 2/2008 | Gu et al. | 455/445 |
| 2010/0311392 A1* | 12/2010 | Stenfelt et al. | 455/411 |

OTHER PUBLICATIONS

Written Opinion, PCT/ISA/237, Apr. 2007.

International Preliminary Report on Patentability, PCT/IB/373, Jan. 2004.

Chinese Office Action, Application No. 200780101781.1, Apr. 6, 2012 with English Translation.

"Application and Development of Anycast Communication", Lingzhi Li et al., "The twentieth China (Tianjin) '2006IT, network, information technology, electronics, instrumentation innovation and conference proceedings", pp. 9-10, Dec. 31, 2006, cited in Chinese Office Action, Application No. 200780101781.1.

"Diameter protocol and its application in IMS", Yuzhong Jia et al., "electronics and computer", p. 118, Dec. 31, 2006, cited in Chinese Office Action, Application No. 200780101781.1.

* cited by examiner

IMS DIAMETER ROUTER WITH LOAD BALANCING

CROSS-REFERENCE TO RELATED APPLICATIONS

This application is a national stage entry of international application number PCT/US2007/086203, having international filing date of Dec. 1, 2007, which was published in English, the entirety of which is hereby incorporated by reference as if fully set forth herein.

FIELD OF THE INVENTION

This invention relates generally to the field of telecommunication systems, and more particularly to IMS routers and methods for load balancing in an IMS subsystem.

BACKGROUND OF THE INVENTION

Diameter is a protocol described in RFC 3588 and has been used in 3GPP IMS (IP Multimedia Subsystem) standards to provide an Authentication, Authorization, and Accounting (AAA) framework for applications such as network access or IP mobility, and has found many new applications in IP networks since the introduction of IMS concepts. In an IMS network, Diameter servers (hosts) can implement various functions, including without limitation Application Server (AS), Policy Decision Function (PDF), Resource Admission Control Subsystem (RACS), AAA, Home Subscriber Server (HSS), Call Control Function (CCF), Charging Data Function (CDF), and Online Charging System (OCS). A Diameter server, moreover, can be implemented as a single network element (NE) or as multiple network elements (e.g., a server cluster). In addition, any network element of an IMS network or other legacy or 2G networks can support Diameter clients which interface with the Diameter server(s) using the Diameter protocol. It is desirable to control or regulate Diameter message traffic flow in an IMS network so as to facilitate optimal system performance and reliability, including NE availability and geographical redundancy. Moreover, it is desirable to balance the load and traffic among the Diameter servers and clients. Conventional IMS networks sometimes include TCP/IP load balance switches (LBS) that monitor the traffic and load among network elements to determine traffic directions based on current network element load status and on the number and size of messages. However, the Diameter protocol is an application based Application Programming Interface (API) built on a network layer above TCP/IP, and thus Diameter traffic control and load balancing cannot be achieved using conventional TCP/IP load balance switches. For example, a TCP/IP layer LBS monitors the loading of IP sockets in the network, whereas Diameter load balance issues are unrelated to individual socket loads since one socket may contain multiple Diameter protocol dialogs for multiple applications.

A limited Diameter routing solution is described in U.S. Pat. No. 7,170,982 to Li et al. with respect to AAA, the entirety of which is hereby incorporated by reference. This router routes an accounting request and response message to an account server for serving calls by a particular subscriber because subscriber data resides in a particular server. When a subscriber originates a call, the account request is transmitted to the Diameter router that determines which account server serves that subscriber and forwards the account request message to selected account server. This router, however, does not address overall Diameter load balancing and traffic control in IMS networks. Other soft switch approaches, such as the Lucent Control Platform (LCP)/Lucent Session Manager (Lucent Soft Switch), operate to direct Diameter messages for IMS network elements to HSS or CCF Diameter Servers, but this load balance mechanism simply chooses the Uniform Resource Identifier (URI) of a destination host to distribute Diameter request messages evenly and randomly, and therefore does not perform effective traffic management and load balancing. Thus, there remains a need for improved methods and apparatus to balance Diameter protocol loading and manage traffic in IMS networks.

SUMMARY OF THE INVENTION

The following is a summary of one or more aspects of the invention to facilitate a basic understanding thereof, wherein this summary is not an extensive overview of the invention, and is intended neither to identify certain elements of the invention, nor to delineate the scope of the invention. Rather, the primary purpose of the summary is to present some concepts of the invention in a simplified form prior to the more detailed description that is presented hereinafter. The various aspects of the present disclosure relate to a Diameter router with network load balancing capability that can advantageously distribute Diameter traffic to Diameter servers based on types of IMS message/sessions, application services, subscriber information, billing information, etc. The Diameter router address is provisioned in clients of the network elements and the clients send initial Diameter request messages for a given session to the router. The router selects a server based at least partially on a type of IMS message session, application services, subscriber information, or billing information, and sends a relayed initial Diameter request message to the selected server. The server, in turn, sends an initial Diameter response back to the router, which then forwards a relayed initial response to the client. The client and the selected server in one implementation send subsequent request and response messages directly to each other for the remainder of the session. Alternatively, the subsequent session messages can be sent through the Diameter router.

In accordance with one or more aspects of the disclosure, a router is provided for receiving and relaying initial Diameter session request and response messages from clients and servers in an IMS network. The router comprises a load balancing component which receives initial Diameter request messages and relays initial Diameter request messages to a selected server in the network based on at least one routing policy, as well as a routing policy engine or component that selects a network server for routing of a given initial Diameter request message based at least partially on a type of IMS message session, application services, subscriber information, or billing information.

In a further aspects of the disclosure, the routing policy component may include a Diameter reference of points component operative to distinguish Diameter Cx, Sh, Rf, Ro, Go, and Gq request messages and to identify suitable host servers in the network capable of providing services associated with the initial Diameter request message, and wherein the routing policy component selects a server for routing a given initial Diameter request message from the identified suitable host servers. In accordance with other aspects of the disclosure, the policy component may include a traffic and load analysis component that dynamically monitors traffic load and an alive status of the servers, where the routing policy component selects a server for routing a given initial Diameter request message based at least partially on the traffic load and alive status of the servers.

In yet another aspect of the disclosure, the routing policy component includes a call session subscriber information component that operates to identify servers that are associated with a subscriber corresponding to the initial Diameter request message based at least partially on a subscriber UE type, a directory number, a service type, or a charging account type of the initial Diameter request message, wherein the server is selected for routing a given initial Diameter request message from the identified host servers.

Other aspects of the disclosure provide that the routing policy component includes a home or visit network component that determines whether a new call session is from a home or visited network, with the policy component selecting a server for routing a given initial Diameter request message based at least partially on whether the call session is from a home or visited network. In another aspect, the policy component includes an accounting information component that parses accounting information including an IMS Charging ID in received Diameter request messages, where the routing policy component selects a server for routing a given initial Diameter request message based at least partially on whether the accounting information.

In accordance with further aspects of the disclosure, routing policy component may include a network element types component to identify a network element type of the requesting client based on the received Diameter request message, where the routing policy component selects a server for routing a given initial Diameter request message based at least partially on the identified network element type. Another aspect provides that the policy component has an application service types component that operates to identify application and service types from received initial Diameter request messages, in which case the session server is selected based at least in part on identified application and service types.

Still further aspects of the disclosure provide that the load balancing component is operative to insert a destination host address corresponding to the selected server and a destination realm corresponding to the router into a relayed initial Diameter request message and to send the relayed initial Diameter request message to the selected server. In addition, the load balancing component can be operative to receive an initial Diameter response message from the selected server and to send a relayed initial Diameter response message to the requesting client.

The router, moreover, may be operative to access, update, and maintain a shared memory with a second router in the network in accordance with yet other aspects of the disclosure.

Other aspects of the disclosure are directed to a communications system that comprises a plurality of network elements coupled to an IMS network and individually comprising one or more Diameter clients, as well as a plurality of Diameter servers operatively coupled with the network, where the servers are configured to perform one or more services requested by the clients. The system further includes a Diameter router operatively coupled with the network, which is comprised of a load balancing component and a routing policy component. The load balancing component receives initial Diameter request messages and relays these to a selected server based on at least one routing policy, and the routing policy component selects a server for routing of a given initial Diameter request message based at least partially on a type of IMS message session, application services, subscriber information, or billing information. In further aspects of the disclosure, the system also includes a second router coupled with the network, where the routers access, update, and maintain a shared memory, and wherein one of the routers may be configured as a primary Diameter router and the other is configured as a secondary Diameter router.

Still other aspects provide that the load balancing component is operative to insert a destination host address corresponding to the selected server and a destination realm corresponding to the router into a relayed initial Diameter request message and to send the relayed initial Diameter request message to the selected server, and the server operates to receive the relayed request message, to copy the address of the router into a destination host field of an initial Diameter response message, and to send the Diameter response message to the router. The router in this case is further operative to receive the initial Diameter response message from the selected server and to send a relayed initial Diameter response message to the requesting client, and the client operates to receive the relayed initial Diameter response message, to copy the selected server address from the destination host field of the relayed initial Diameter response message, and to send subsequent Diameter messages for a current session directly to the selected server. Alternatively, the client and selected server may send the subsequent session messages through the Diameter router.

Still other aspects of the disclosure provide a method for routing Diameter messages for a Diameter session in an IMS network. The method comprises a client sending an initial Diameter request message to a Diameter router in an IMS network, and the router selecting a server based at least partially on a type of IMS message session, application services, subscriber information, or billing information, and sending a relayed initial Diameter request message to the selected server. The method may further comprise at the Diameter router, inserting a destination host address corresponding to the selected server and a destination realm corresponding to the router into the relayed initial Diameter request message, as well as receiving the relayed request message at the selected server, copying the address of the router into a destination host field of an initial Diameter response message, and sending the Diameter response message to the router. In addition, the method may include receiving the initial Diameter response message at the router, sending a relayed initial Diameter response message to the requesting client, as well as the client receiving the relayed initial Diameter response message, copying the selected server address from the destination host field of the relayed initial Diameter response message, and sending subsequent Diameter messages for a current session through the router or directly to the selected server.

BRIEF DESCRIPTION OF THE DRAWINGS

The following description and drawings set forth in detail certain illustrative implementations of the present disclosure, which are indicative of several exemplary ways in which the principles of the disclosure may be carried out. Various objects, advantages, and novel features of the disclosure will become apparent from the following detailed description when considered in conjunction with the drawings, in which.

DETAILED DESCRIPTION OF THE INVENTION

Figure 1:
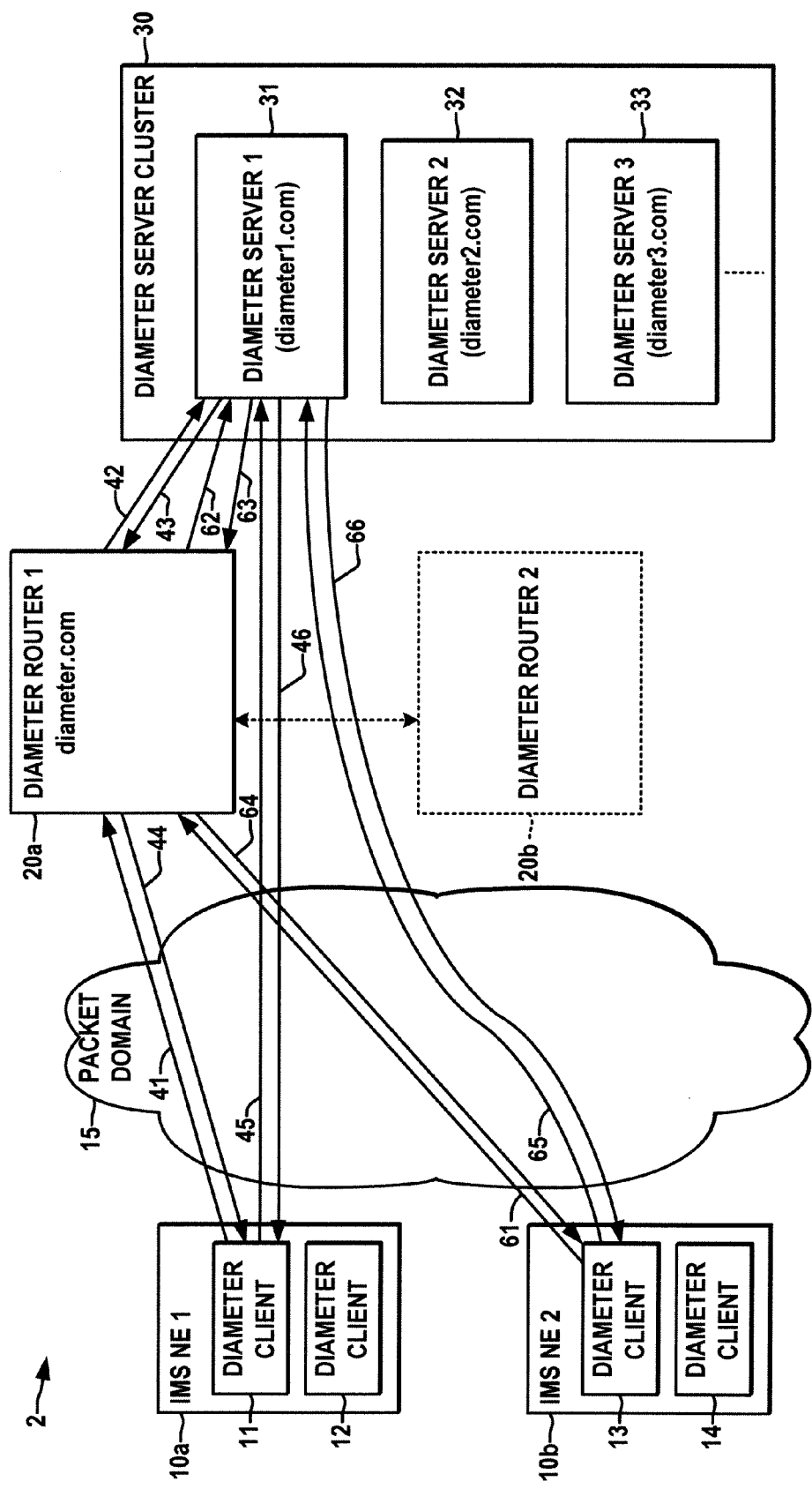
FIG. 1 is a schematic diagram illustrating an exemplary IMS network with Diameter Routers in which one or more aspects of the present disclosure may be carried out.

Referring now to the figures, several embodiments or implementations of the various aspects of the present disclosure are hereinafter illustrated and described in conjunction with the drawings, wherein like reference numerals are used to refer to like elements.

Referring initially to FIG. 1, an exemplary IMS network or system 2 is illustrated for supporting various telecommunications services. The network 2 includes one or more IMS network elements 10, wherein only two such elements 10a and 10b are illustrated in the figure so as not to obscure the various aspects of the disclosure, and where the network includes various other elements normally associated with an IMS network. The elements 10 can be implemented in any suitable form of hardware, software, firmware, logic, or combinations thereof, and may be constructed as a single component such as a server, etc., or may be implemented in distributed fashion across two or more components operatively associated with the IMS network 2 in accordance with the disclosure. As shown in FIG. 1, moreover, the network elements 10 may individually comprise one or more Diameter clients, such as applications or other components implemented in the network elements 10. In the illustrated example, exemplary Diameter clients 11 and 12 of a first network element 10a as well as clients 13 and 14 of a second network element 10b, although the various load balancing and routing aspects of the present disclosure can be implemented in association with any number and combination of clients and network elements in an IMS network 2.

The network 2 further includes one or more Diameter server clusters 30, wherein the illustrated server cluster includes three exemplary Diameter servers (hosts) 31, 32, and 33. In practice, the servers of the cluster 30 implement services related to telecommunications, and thus provides various hardware and/or software network elements including call session control functions (CSCF), Home Subscriber Server (HSS), Global Roaming Application Server (GRAS), media gateway (MGW) and media gateway control function (MGCF), border gateway control function (BGCF), multimedia resource function processor (MRFP), media resource function control (MRFC), etc. in order to manage call sessions and provide packet switching for multimedia communications (e.g., text messages, packetized voice communications, etc.) within the network 2 and other IMS network functions, where user equipment (not shown) may be operatively connected to the IMS network 2 via a radio access network (RAN) that provides subscriber or visitor access, including radio base stations and control and concentration nodes (not shown). Data or bearer paths in the network 2 carry or relay the communication traffic and/or user information intended to be transmitted from one device to another, and control paths transfer associated signaling and/or control commands or messages to and between appropriate network elements and/or entities in the IMS network 2 such that call sessions are properly managed and routed using call control and signaling functionality via the CSCF, BGCF, MGCF, MRFC, and GRAS and bearer paths interfacing via MRFP and MGW to provide and support interconnectivity to external networks and/or subsystems such as packet data subsystems, a public data network (PDN) and public switched telephone/public land mobile networks (PSTN/PLMN) that may be operatively coupled with the media gateway.

In operation, a CSCF supports and controls multimedia sessions in which the MGCF and/or the MRFC are invited to call sessions to provide the bearer paths as needed for a call session, whereby the CSCF thus provides incoming call gateway (ICGW), call control function (CCF), serving profile database (SPD) and address handling (AH) functions. The ICGW function operates as a session entry point and routes incoming calls and the CCF executes call setup/termination and state/event management and interacts with the MGCF for calls to or from the PSTN/PLMN, and with the BGCF for calls to the PSTN/PLMN to determine the appropriate MGCF to use. In addition, the CCF function controls the MRFP via the MRFC, where the MRFC interprets information or signals coming from the CSCF and controls the MFRP accordingly, in order to support conferencing and other multi-party services. The CCF implements subscriber registrations and may also provide service trigger mechanisms to the GRAS or other application server to invoke services provided thereby. The CCF function, moreover, operates to report call events for billing, auditing, intercept or other purposes, and may query the address handling functionality to ascertain whether a requested outgoing communication is allowed given the current subscription. The serving profile database function interacts with the HSS to receive and cache user profile information, including an indication of whether a given user equipment is a multimode device, wherein the address handling functionality includes address analysis, translation, modification (when appropriate), and/or mapping.

The MGW operates as an interface for bearer path transfer between the network 2 and other networks (e.g., PSTN, not shown), and provides resources for translation and encoding, transcoding, compression, packetizing, depacketizing, etc. with respect to bearer path traffic. The MGW also interacts with the MGCF, which in turn interprets signaling from the CSCF and controls the MGW accordingly for resource allocation, bearer path control, and payload processing. The MGCF communicates with the CSCF to control the call state for media channels on one or more media gateways, and also performs conversions between legacy and 3G UMTS/CDMA network call control protocols. In addition, the MRFC manages media stream resources in the MRI-P, which also acts as a bearer path interface between the network 2 and external networks and/or subsystems, while providing conferencing, multiple party communications, or other media services with respect to the gateway. The HSS maintains subscriber and system related data, user profiles, locations, etc., along with memory resources to provide for user identification through numbering and addressing information, user security information, including network access control information for authentication and authorization, user location information for user registration and locating, as well as user profiles including indications of dual mode functionality and identification of the services subscribed to and other service specific information.

Figure 2:
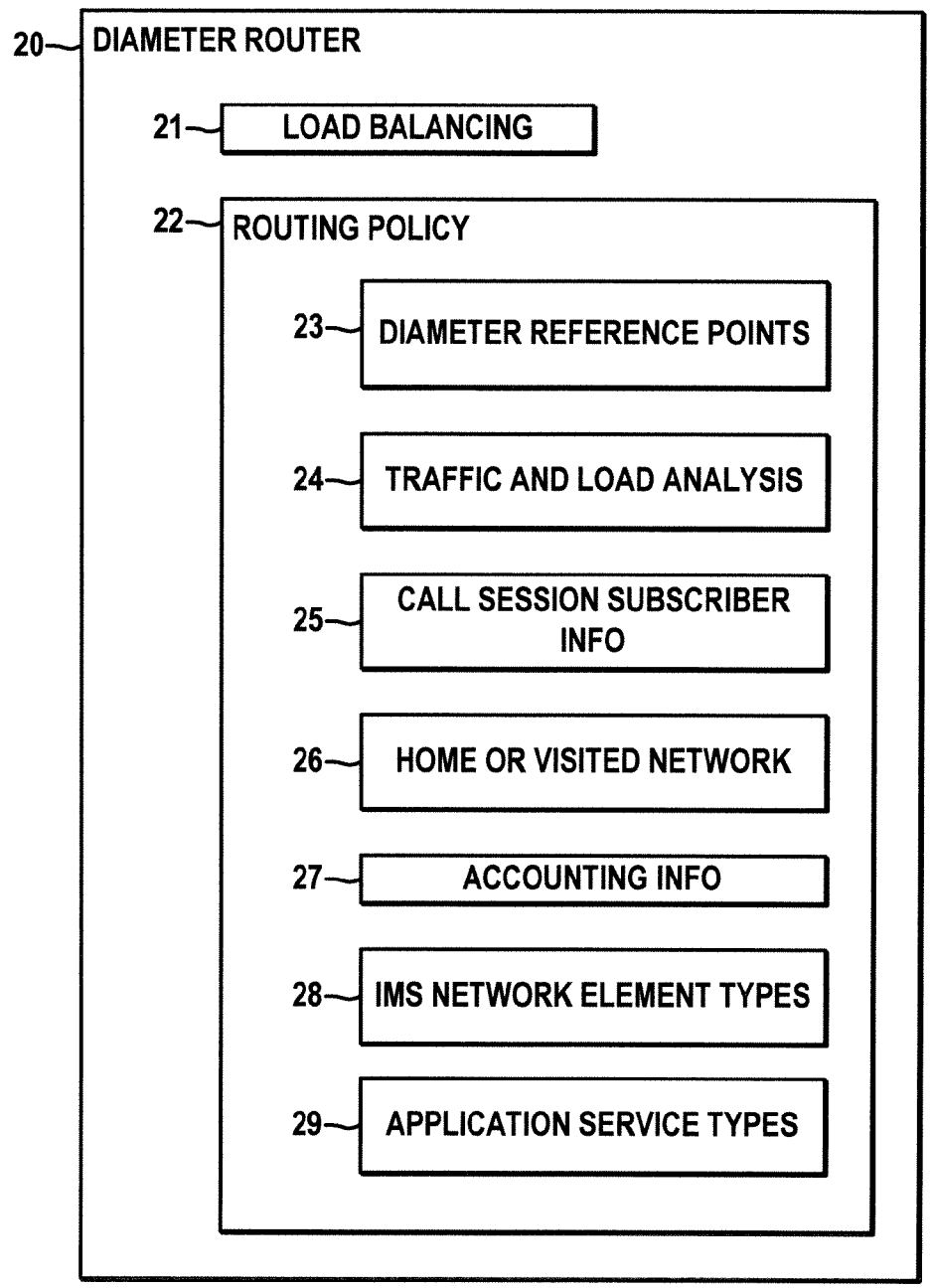
FIG. 2 is a schematic diagram illustrating further details of the load balancing Diameter router of FIG. 1.

Referring now to FIGS. 1 and 2, in accordance with the present disclosure, the network 2 includes one or more Diameter routers 20, wherein two such routers 20a and 20b are shown in FIG. 1 for illustrative purposes, although any number of such routers 20 may be provided in accordance with the present disclosure. The Diameter routers 20 operate as a proxy for a first pair of Diameter messages in a given session, with the remaining session Diameter messages being either communicated between the requesting Diameter client 11, 12, 13, or 14 and the selected host server 31, 32, or 33 directly without the proxy of Diameter router so as to diversify traffic congestion in Diameter router 20, or alternatively the subsequent Diameter session messages are sent through the router 20. Moreover, the router 20 performs load balancing with respect to the servers 31-33 of the cluster 30 through section of the server that will handle a given session, where the router 20 can select from any number of available and suitable equipped Diameter servers and may implement any sort of load balancing algorithm or scheme in accordance with the present disclosure.

For a given session in which one of the clients 11-14 requires the services of one of the host servers 31-34 in the cluster 30, the appropriate server is selected by the router 20, and the client and selected server initially exchange messages with the router 20. As shown in FIG. 2, the exemplary router 20 includes a load balancing component 21 and a routing policy component 22, which can be software, hardware, logic, etc., or combinations thereof, by which the router 20 determines which host servers 31, 32, and/or 33 is capable of providing the requested service and selects one of the servers 31-33 for the session. The routing policy component 22 comprises a Diameter reference points component 23, a traffic and load analysis component 24, a call session subscriber information component 25, a home or visited network component 26, an accounting information component 27, an IMS network element types component 28, and an application service types component 29.

In operation, the Diameter router 20 selects the destination host to which the Diameter requesting message will be relayed, and the router 20 executes a policy management function via component 22 based on load balancing conditions and other policies 23-29, by which the present disclosure facilitates improved operation compared with conventional TCP/IP and Diameter routing solutions. FIG. 1 shows an example Diameter session in which a first client 11 of the first IMS network element 10a in FIG. 1 requires a service that can be handled by any of the host Diameter servers 31-33 in the Diameter server cluster 30. In a first pair of Diameter messages 41-44 of the session in one embodiment, the client 11 sends a first Diameter request message 41 with a destination realm indicating the diameter router 20 (e.g., "diameter.com") but without a destination host address. The Diameter router 20, acting as a proxy, performs policy management and selection of one of the destination host servers, host server 31 in this example. The router 20 then routes the message 42 to the selected Diameter host 31, including a destination realm ("diameter.com") and a host address (e.g., "diameter 1.com" in this example) that indicates the selected server 31. The Diameter host server 31 receives the relayed request message 42 and copies the destination realm and host addresses ("diameter.com" and "diameter 1.com") from the message 42 into the origin realm and host address fields of the corresponding Diameter response message 43 and sends this message 43 to the Diameter router 20. The router 20, in turn, relays the response message 44 to the requesting client 11 in the first network element 10a.

Once the client 11 receives the first Diameter response message 44 via the router 20, the client 11 will recognize the origin realm and origin host fields and accordingly send the subsequent Diameter messages 45 associated with the session directly to the selected Diameter host server 31, thereby bypassing the Diameter router 20 for the remainder of the session. In this regard, the client 11 copies the origin realm and host addresses from received first Diameter response message 44 into the destination realm and host address fields of the subsequent session messages 45. The host server, in turn, responds with messages 46 directly to the client for the remainder of the session. In addition, the load balancing component 21 of the Diameter router 20 dynamically monitors the traffic flows to each Diameter host server 31-33 and adjusts the destination of initial Diameter request messages for each session based on the monitored traffic flow and other routing policy considerations so as to facilitate Diameter load balancing among the nodes of the IMS network 2. In an alternate embodiment, the subsequent session messages 45, 46, etc. for the session are again routed through the Diameter router 20 which remains acting as a proxy for the entire session or at least a portion thereof beyond the initial request and response messaging 41-44.

As noted above, the Diameter router 20 performs the load balancing and routing operations in accordance with a plurality of policy considerations via one or more of the components 23-29. As depicted in FIG. 2, the major routing policies 22 include the Diameter reference of points component 23 that operates to distinguish the nature of Diameter request messages and the suitable host servers therefor, including without limitation Cx, Sh, Rf, Ro, Go, Gq, etc. in selecting the Diameter host server 31-33 to which a given request will be routed. For example, Rf type requests will be routed to a server 31-33 that provides CCF or CDF functionality, whereas Ro messages will be routed to servers 31-33 configured to support OCS functions, and Cx or Sh messages will be selectively routed to HSS configured servers 31-33.

Another routing policy is implemented via the traffic and load analysis component 24, which the router 20 employs to dynamically monitor the traffic load (e.g., queued messages) of each of the host servers 31-33, as well as the alive status at each host 31-33. By this analysis, the router 20 can advantageously refrain from sending new Diameter request messages to a given host 31-33 if it is currently overloaded or down, despite being configured to support the requested service associated with a given request message.

In addition, the routing policy component 20 includes a call session subscriber information component 25 that preferably includes a subscriber-to-host mapping table or which is operatively coupled to access and external subscriber-to-host mapping table. The router 20 will check the mapping table to identify the routing destination host that is associated with a given subscriber, for example, such that a Diameter request message with subscriber having a prepaid account associated with a specific OCS will be routed to the host 31-33 that implements that specific OCS. The mapping table may also specify primary and secondary host server names and addresses, to provide for alternate host selection and message forwarding if the primary host server is down or unavailable. In this manner, the Diameter router 20 can support intelligent routing and load balancing in consideration of service requests that are subscriber specific, for instance, where the subscriber information can include subscriber UE type, directory number, service type, charging account type, etc.

The home or visit network component 26 operates to determine whether a new call session is from a home or visited network, and to selectively determine the routing destination host server 31-33 accordingly. In this regard, there may be different configurations depending upon whether a call (and accordingly the initial request message) from a visited network should be routed to a home network server or to a visited network server, based on call types and other network configuration factors. For instance, where a caller roams to, and initiates a call in, a visited network, the terminating S-CSCF will query the visit network HSS via Sh and will send charging information to the home CCF via Rf.

The router 20 also includes an accounting information component 27 with which the router 20 parses accounting information in the Diameter request message to determine any charging-related routing. Thus, for online charging, the initiating request message can be relayed to a server 31-33 providing the OCS functions, whereas for offline charging, the request message can instead be routed to a host server 31-33 that provides CCF or CDF functions. In this regard, a given IMS network element or node may send many Diameter messages with a unique IMS Charging ID (ICID) which is used to correlate Charging Data Records (CDRs) generated at the CCF/CDF for an IMS call. As part of the Diameter load balancing feature, the Diameter router 20 will check the ICID Attribute Value Pair (AVP) from the Diameter request messages and route all messages with the same ICID to a host server 31-33 implementing a single CCF or CDF so that the selected host can generate CDR files for a given call in the same place or even correlate all CDRs with same ICID into one consolidated CDR. In this respect consolidation of all CDRs into a single CDR is facilitated by the disclosed router 20 by selective routing to the same server 31-33, whereas otherwise it is extremely difficult or impossible to consolidate charging information or CDRs if charging messages for these are not all routed to the same charging host, whereby the present disclosure provides this additional advantage over conventional routers and load balancing schemes.

The IMS network element types component 28 operates to differentiate NE types based on the received requesting Diameter message, such that the routing can be selected according to the network element type. In this manner, the Diameter router 20 can facilitate the routing of request messages from a given network element 10 to the same destination host server 31-33 handling other sessions for clients of that network element 10, if the host 31-33 has sufficient network element data to process the request message.

The Diameter router 20 further includes an application service types component 29 that distinguishes application and service types from the received initial Diameter request messages in determining the routing destination. For example, a Diameter request message for calling card service policy management application can thus be routed to a server supporting Calling Card Application Server (CCAS) rather than to a server 31-33 that implements a Policy Decision Function (PDF). The routing policy component 22 may also include other components to provide for routing decisions based on other criteria, such as media or host change during the call, geographical distribution, time/day/week considerations, etc.

Thus, the Diameter router 20 provides advanced load balancing 21 and policy components 22 to implement traffic management and load balancing in the IMS network 2 to an extent not achievable with conventional techniques, and also to facilitate other network operation improvements not contemplated previously. Moreover, as shown in FIG. 1, one or more additional Diameter routers 20b may be provided in the IMS network 2 so as to provide redundancy or load sharing of the proxy and routing functions described herein, and also to provide a backup if the first or primary Diameter router 20a is overloaded, unavailable, or inoperative. In this respect, the network elements 10 may be provisioned with a primary Diameter router address and a secondary or backup Diameter router address whereby the routers 20 can function as Diameter message proxies even in networks 2 having high traffic loads.

The Diameter router 20 thus provides a routing policy engine or component 22 that performs Diameter destination host selection based on one or more components 23-29 of an advanced set of routing criteria which may be provisioned and stored in a database within or outside the Diameter router 20, and the router 20 dynamically conducts traffic analysis and host alive monitoring on each Diameter host 31-33. Upon receiving a Diameter request message from a client, the router 20 executes the policy engine 22 to select a destination host 31-33 as described above, fills the "Destination-host" AVP with the address of the selected host 31-33 in the requesting message, and delivers the request message to the selected host. If the primary selected host is down or unavailable, the router 20 proceeds to try a secondary (e.g., next available) host 31-33 by updating the "Destination-host" AVP with the next selected host address. Once the router 20 receives the first response message from the selected host 31-33, the router 20 relays the response to the client without changing the origin and destination host information.

In conjunction with the provision of the Diameter router 20 as described above, the network elements 10 and the clients 11-14 thereof and the host servers 31-33 of the IMS system 2 are enhanced in the present disclosure. Thus, for a first embodiment, the Diameter host servers 31-33 are preferably configured to differentiate between a received request message is an initial (first) Diameter message of a new session, such as a request message in [start] or [event], and other messages such as a message in [interim] with media change or host change during a call. The servers 31-33 in the first embodiment are further configured to send responses to the initial messages to the Diameter router 20 and to respond directly to non-initial request messages. In responding to initial or first Diameter request messages, the servers 31-33 are configured to copy address of "Destination-realm" and "Destination-host" AVPs from the received requesting message into the "Origin-realm" and "Origin-host" AVPs in the response message, which is then sent back to the Diameter router 20. For non-initial messages, the servers 31-33 copy the address of "Destination-realm" and "Destination-host" AVPs in the requesting message into "Origin-realm" and "Origin-host" AVPs in the response message and send the response directly to the requesting client 11-14. In a second embodiment, the servers 31-33 are configured to continue sending the subsequent Diameter response messages to the router 20 which continues to act as a proxy for the client and selected server for a given session.

The Diameter clients 11-14, moreover, are provisioned with the address of the Diameter router 20a (and also optionally provisioned with the address of a secondary or backup Diameter Router 20b in FIG. 1). When the client 11-14 sends an initial Diameter request message (e.g., message 41 in the example of FIG. 1), the message is constructed to include the Diameter router's address in the "Destination-realm" AVP field of the message 41, since the router 20 operates as a proxy for intelligent routing of the initial Diameter messages in the IMS network 2. In the first embodiment, moreover, when the clients 11-14 receive a first response message for a given session, the clients 11-14 are configured to direct remaining Diameter request messages for that session directly to the host server selected by the router 20, to thereby alleviate the traffic load on the router itself. In this regard, the clients 11-14 copy the "Origin-realm" and "Origin-host" AVPs from the first response message into the "Destination-realm" and "Destination-host" AVPs in the subsequent Diameter request messages which are then directly sent to the selected host server 31-33. Other IP routers within the IMS system 2, moreover, are preferably configured as a default to route any Diameter request messages to the Diameter router 20 if the "Destination-host" AVP thereof is empty. In the second embodiment, the clients 11-14 of the network elements 10 continue to send request messages for all or a prt of the remainder of a given session to the router 20.

Figure 3A:
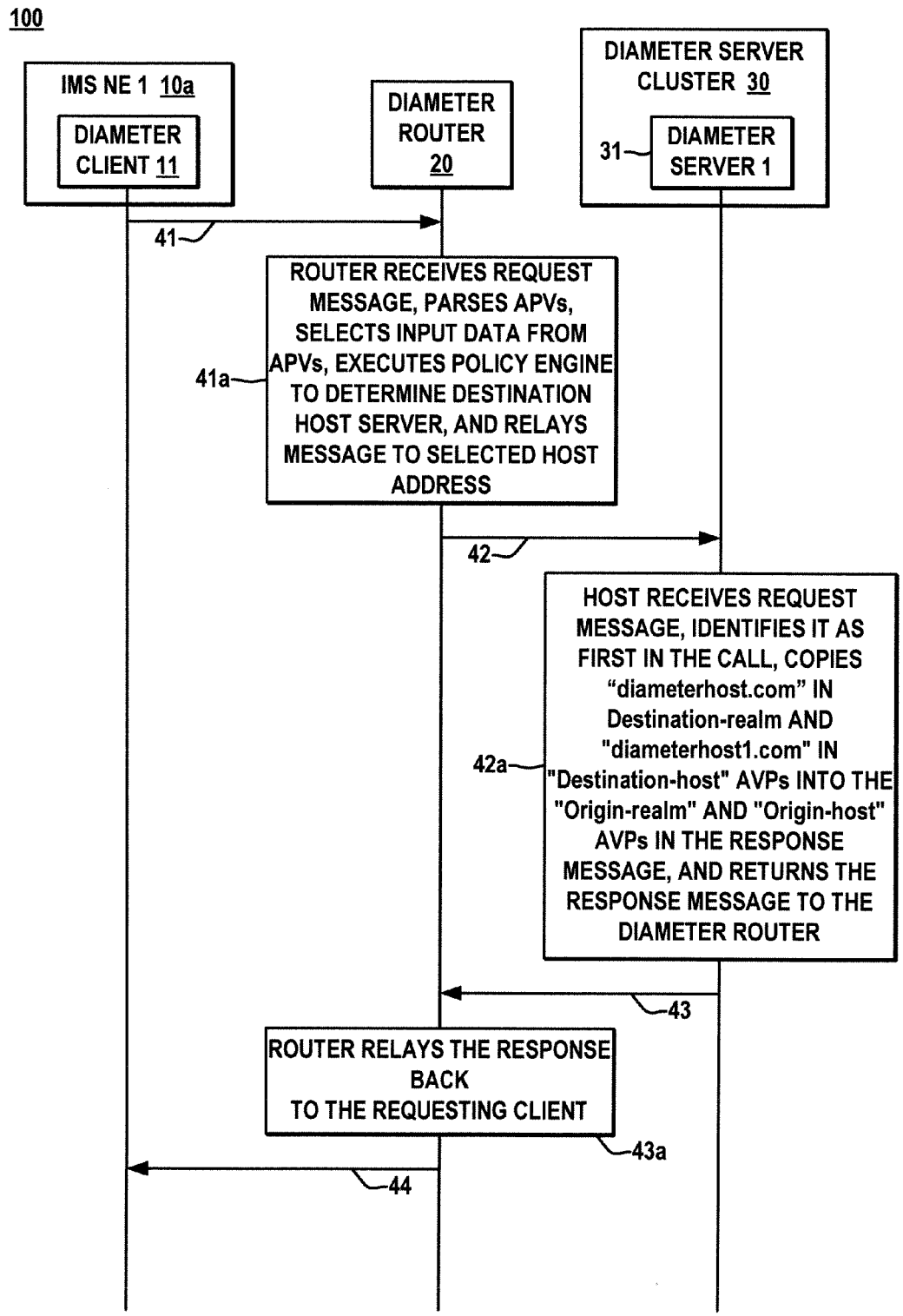
FIGS. 3A and 3B illustrate a signal flow diagram depicting load balancing operation of the exemplary Diameter router in routing a Diameter dialog initiated by a client in an IMS network element.
Figure 3B:
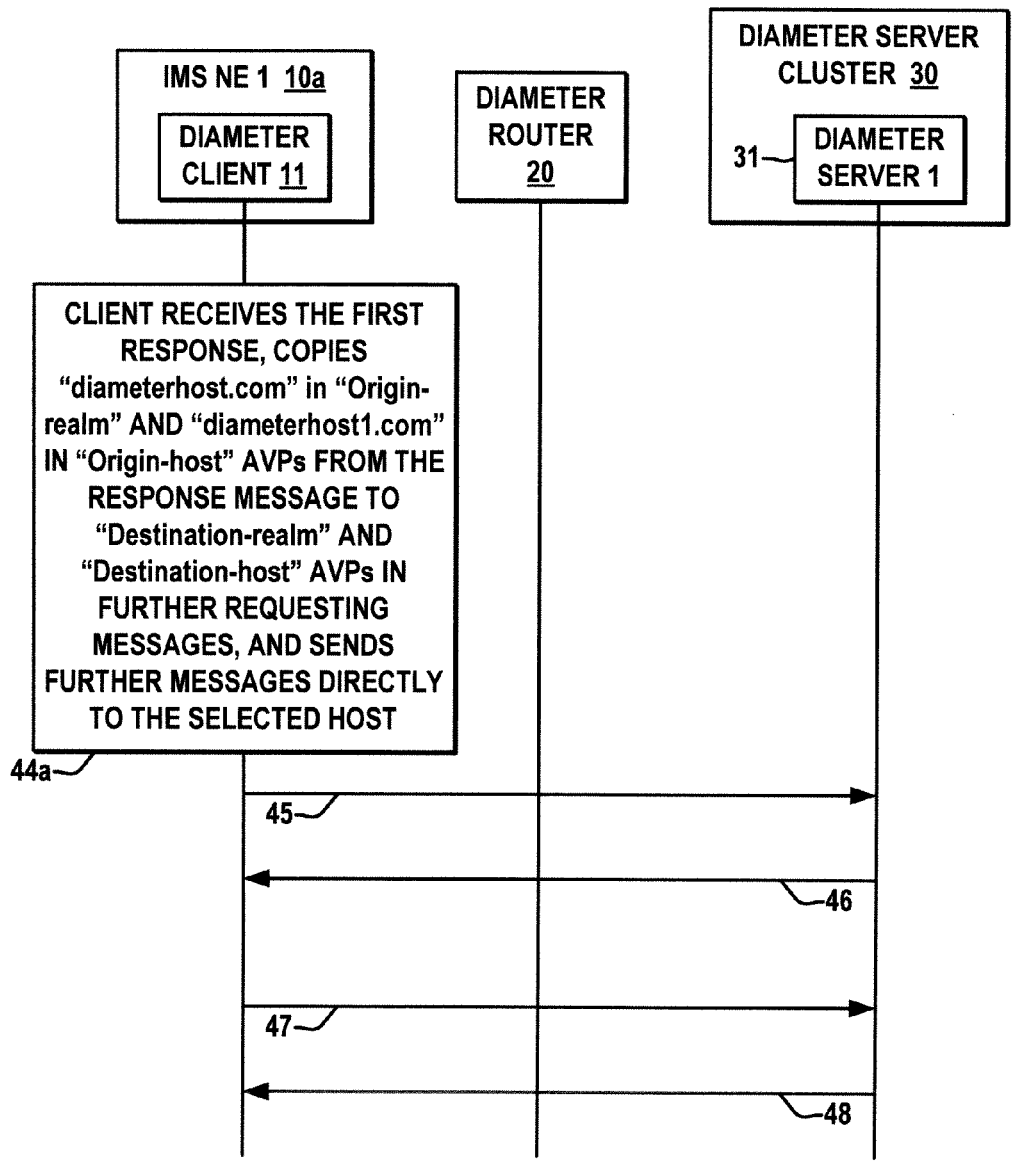

FIGS. 3A and 3B illustrate a signal flow diagram 100 showing an exemplary load balancing scenario in which the first embodiment of the Diameter router 20 operates as a proxy for initial request messages by clients 11-14 and selects appropriate host servers 31-33 to service the clients while performing load balancing and traffic monitoring and management in the IMS network 2. In this example, the Diameter client 11 of the first network element 10a (FIG. 1) initiates a Diameter session with a request message 41, which is routed to the Diameter Router 20 as shown in FIG. 3A. The client 11 in this case fills the "Destination-realm" AVP of the message 41 with "diameter.com" by which the message 41 is directed to the Diameter router 20.

At 41a in FIG. 3A, the router 20 receives the request message 41 from the client 11, and parses the AVPs in the message. The router 20 selects input data from the AVPs, and executes the routing policy component or engine 22 to determine the destination host 31-33. The routing policy component 22 identifies the selected host server (server 31 in this example) based on one, some, or all of the selection criteria components 23-29 (FIG. 2), populates the "Destination-host" AVP with the selected host address "diameter1.com", and relays the request message 42 to the selected host server 31.

The selected server 31 receives the relayed request message at 42a, identifies this as a first requesting message in a call session, copies "diameterhost.com" in "Destination-realm" and "diameterhost1.com" in "Destination-host" AVPs of the requesting message 42 into the "Origin-realm" and "Origin-host" AVP fields of the response message 43, and sends the response message 43 to the Diameter router 20. At 43a, the router 20 receives the response message 43 and relays the response message 44 to the requesting client 11 without changes to "Origin-realm" and "Origin-host" AVPs.

As shown in FIG. 3B, the requesting client 11 receives the first response at 44a and copies "diameter1.com" of the "Origin-realm" as well as "diameter1.com" of the "Origin-host" AVP fields in the response message 44 into the "Destination-realm" and "Destination-host" AVP fields in the next and subsequent request messages, and then sends the next request message 45 directly to the selected host server 31. The server 31 receives the next request message 45, and copies "diameter1.com" in "Destination-realm" and "diameter1.com" in "Destination-host" AVPs in the requesting message into "Origin-realm" and "Origin-host" AVPs in the next response message 46, and returns this directly to the client 11. Thereafter as shown in FIG. 3A, the client 11 and the server 31 directly exchange further Diameter messages 47, 48, etc. as part of the session without further intervention by the Diameter router 20. As noted above, in a second embodiment, the requesting client 11 and the selected server 31 continue to send and receive messages (e.g., messages 45-48 in FIG. 1) via the router 20 for all or part of the rest of the session beyond the initial request and response messages 41-44.

To further illustrate the exemplary routing and load balancing aspects of the disclosure, the following describes an example routing of a Diameter Rf dialog session in an IMS network, in which a client in a first network element (e.g., client 11 in FIG. 1 above) desires charging services from a CCF server in the network. This client 11 initiates a Diameter Rf dialog by constructing a Diameter Rf ACR [start] request message 41 (accounting request) with the "Destination-realm" AVP indicating "charging.com". This allows the network to direct the ACR message to the Diameter router (e.g., router 20 described above). Upon receipt of the ACR message 41, the Diameter router 20 parses the AVPs in the message, selects input data from the AVPs, and executes the policy engine (e.g., routing policy component 22 in FIG. 2 above) to determine the appropriate destination host (server 31 in this example). With the host 31 selected, the router 20 populates the "Destination-host" AVP of the request message 42 with the selected host address, in this example, "ccf1.charging.com" for the selected host server 31 that can provide the requested CCF function, and the router 20 relays the ACR request message 42 [start] to the selected host CCF 1 (server 31).

The host 31 (CCF 1) receives the relayed request message 42 from the router 20, and identifies it as a first requesting message in the call. Accordingly, the host 31 copies "charging.com" in the "Destination-realm" AVP field and "ccf1.charging.com" in the "Destination-host" AVP field of the ACR message 42 into the "Origin-realm" and "Origin-host" AVP fields in an Account Answer (ACA) response message 43 [start], and returns the ACA message 43 to the Diameter router 20. The router 20 then relays the ACA response message 44 back to the requesting IMS network element client 11 without changing the "Origin-realm" or "Origin-host" AVPs. The client 11 receives the first ACA response message 44 and copies "charging.com" in "Origin-realm" AVP and "ccf1.charging.com" in the "Origin-host" AVP of the received ACA message 44 into "Destination-realm" and "Destination-host" AVPs in a subsequent ACR message 45 (e.g., ACR [interim] or [stop]), and sends this message 45 directly to the CCF 1 host 31. Upon receiving the ACR message 45 from the client 11, the host CCF 31 copies "charging.com" in the "Destination-realm" APV and "ccf.1.charging.com" in the "Destination-host" AVP of the ACR message 45 into "Origin-realm" and "Origin-host" AVPs in the response ACA message 46, and returns the response message 46 directly to the client 11 in the IMS network element 10a.

Further in this example, a client 13 of a second IMS network element 10b (FIG. 1) initiates a different Diameter Rf dialog by constructing an accounting request (ACR) message 61 [start], filling the "Destination-realm" AVP of the message 61 with "charging.com" to allow the network 2 to direct the ACR message 61 to the Diameter router 20. The Router, in turn, receives the ACR [start] message 61 from the client 13, parses and selects input data from the AVPs in the message 13, and executes the routing policy component to determine the destination host. In this case, since there is an identical ICID sent from the client 11 in the first network element 10a as determined using the accounting information component 27 (FIG. 2), the routing policy component 22 selects the same CCF host 31 for this second session. Accordingly, the router 20 fills the "Destination-host" AVP with "ccf1.charging.com" to indicate that the server 31 has been selected for the second session, and relays the ACR 62 message [start] to CCF 1 server 31. The server 31 receives the request message 62, identifies it as a first requesting message in the call, copies "charging.com" in "Destination-realm" and "ccf1.charging.com" in "Destination-host" AVPs in the ACR message 62 into the "Origin-realm" and "Origin-host" AVPs in the corresponding ACA response message 63 [start], and returns the ACA message 63 to the Diameter router 20

The router 20 relays the ACA message 64 to the client 13 in the second network element 10b without changing the "Origin-realm" and "Origin-host" AVPs. The client 13 receives the first response 64 and copies "charging.com" in the "Origin-realm" AVP and "ccf1.charging.com" in "Origin-host" AVP thereof into the "Destination-realm" and "Destination-host" AVPs of the next ACR message 65 [interim] or [stop] of the session, and sends this directly to the CCF 1 server 31. The server 31 receives the ACR message 65 and copies "charging.com" in the "Destination-realm" APV and "ccf.1.charging.com" in the "Destination-host" AVP of the received message 65 into the "Origin-realm" and "Origin-host" AVPs in the responsive ACA message 66, and returns the response message 66 directly to the Diameter client 13 of the second network element 10b. The router 20 thus advantageously facilitates online charging by checking the ICID AVP from the Diameter request messages and routing all messages with the same ICID to a host server 31-33 implementing a single CCF or CDF. In this manner, the selected host server 31 can correlate all CDRs with same ICID into one consolidated CDR. For example, accounting messages in one call session could be routed to a single server 31 as in the above example so that the server can aggregate and correlate multiple CDRs from different network elements 10a and 10b into one consolidate CDR which is much easier to be converted and processed by a downstream billing system. Thus, the routing policy component 22 can advantageously determine situations in which it is desirable to route all Diameter messages of one call or session, even if from different network elements 10 or different clients 11-14, to the same server 31.

The disclosure thus contemplates an enhanced Diameter router 20 with network load balance capability that distributes Diameter traffic to servers that are selected based on types of IMS message/sessions, application services, subscriber information, billing information, etc. The Diameter load balancing, moreover, may be applied to all Diameter clients and servers in the IMS network 2, whereas previous routing solutions were only applicable to certain services (e.g., AAA service routers). In this regard, the Diameter servers (hosts) supported for intelligent routing by the router 20 may include without limitation Application Server (AS), Policy Decision Function (PDF), Resource Admission Control Subsystem (RACS), AAA, HSS, CCF, CDF, and OCS, which themselves may be unitary network elements 10 or which may be implemented in distributed fashion across multiple network elements, such as in the cluster 30 shown in FIG. 1.

The Diameter router 20, moreover, takes into account the current loading and status of a given server in determining whether that server 31-33 will be selected to support a given new session in the network 2. In this regard, if the primary destination host 31-33 is down or unavailable, the Diameter router 20 will alter the routing destination to a secondary or next available destination host 31-33 accordingly. By the provision of this intelligent Diameter router 20, the IMS network 2 is provided with enhanced Diameter load balance capability to distribute Diameter message traffic according to many authentication, accounting, and service based criteria, by which the load balancing can be done based on the types of IMS message/sessions, application services, subscriber information, billing information, current server loading, etc.

Furthermore, additional Diameter routers 20b may be advantageously employed in order to provide redundancy or load sharing of the proxy and routing functions of the router 20, as shown in FIG. 1 above. Thus, a second router 20b can serve as a backup if the first or primary Diameter router 20a is overloaded, unavailable, or inoperative, or two or more Diameter routers 20 may be concurrently operated in the network 2 with the clients 11-14 being provisioned to use either router 20 as a primary routing proxy, where the routers 20 advantageously share memory access to facilitate coordinated routing decisions (e.g., the router 20a and 20b may cooperatively share, update, and maintain a shared memory with accounting information and other data). In this respect, the network elements 10 may be provisioned with a primary Diameter router address and a secondary or backup Diameter router address whereby the routers 20 can function as Diameter message proxies even if networks 2 having high traffic loads.

While the invention has been illustrated and described with respect to one or more exemplary implementations or embodiments, equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, although a particular feature of the invention may have been disclosed with respect to only one of several implementations, such feature may be combined with one or more other features of the other implementations as may be desired and advantageous for any given or particular application.

Also, to the extent that the terms "including", "includes", "having", "has", "with", or variants thereof are used in the detailed description and/or in the claims, such terms are intended to be inclusive in a manner similar to the term "comprising".

The following is claimed:

1. A router for receiving and relaying initial Diameter session request and response messages from clients and servers in an IMS network, respectively, the router comprising:
   at least one processor;
   a load balancing component implemented using the at least one processor and operative to receive initial Diameter request messages and to relay initial Diameter request messages to a selected server in the network based on at least one routing policy; and
   a routing policy component implemented using the at least one processor and operative to select a server of the network for routing of a given initial Diameter request message based at least partially on a type of IMS message session, application services, subscriber information, or billing information;
   wherein the router operates as a proxy for a first pair of Diameter messages in a given session, with the remaining Diameter messages for the given session communicated directly between a Diameter client and the selected server.

2. The router of claim 1, wherein the routing policy component includes a Diameter reference of points component implemented using the at least one processor and operative to distinguish Diameter Cx, Sh, Rf, Ro, Go, and Gq request messages and to identify suitable host servers in the network capable of providing services associated with the initial Diameter request message, and wherein the routing policy component selects a server for routing a given initial Diameter request message from the identified suitable host servers.

3. The router of claim 1, wherein the routing policy component includes a traffic and load analysis component implemented using the at least one processor and operative to dynamically monitor traffic load and an alive status of the servers, and wherein the routing policy component selects a server for routing a given initial Diameter request message based at least partially on the traffic load and alive status of the servers.

4. The router of claim 1, wherein the routing policy component includes a call session subscriber information component implemented using the at least one processor and operative to identify servers that are associated with a subscriber corresponding to the initial Diameter request message based at least partially on a subscriber UE type, a directory number, a service type, or a charging account type of the initial Diameter request message, and wherein the routing policy component selects a server for routing a given initial Diameter request message from the identified host servers.

5. The router of claim 1, wherein the routing policy component includes a home or visit network-component implemented using the at least one processor and operative to determine whether a new call session is from a home or visited network, and wherein the routing policy component selects a server for routing a given initial Diameter request message based at least partially on whether the call session is from a home or visited network.

6. The router of claim 1, wherein the routing policy component includes an accounting information component implemented using the at least one processor and operative to parses accounting information including an IMS Charging ID in received Diameter request messages, and wherein the routing policy component selects a server for routing a given initial Diameter request message based at least partially on the accounting information.

7. The router of claim 1, wherein the routing policy component includes a network element types component implemented using the at least one processor and operative to identify a network element type of the requesting client based on the received Diameter request message, and wherein the routing policy component selects a server for routing a given initial Diameter request message based at least partially on the identified network element type.

8. The router of claim 1, wherein the routing policy component includes an application service types component implemented using the at least one processor and operative to identify application and service types from received initial Diameter request messages, and wherein the routing policy component selects a server for routing a given initial Diameter request message based at least partially on identified application and service types.

9. The router of claim 1, wherein the load balancing component is operative to insert a destination host address corresponding to the selected server and a destination realm corresponding to the router into a relayed initial Diameter request message and to send the relayed initial Diameter request message to the selected server.

10. The router of claim 9, wherein the load balancing component is operative to receive an initial Diameter response message from the selected server and to send a relayed initial Diameter response message to the requesting client.

11. The router of claim 1, wherein the router is operative to access, update, and maintain a shared memory with a second router in the network.

12. The router of claim 1, where the router is separate from the clients.

13. A communications system, comprising:
a plurality of network elements operatively coupled to an IMS network, the network elements individually comprising one or more Diameter clients;
a plurality of Diameter servers operatively coupled with the network, the servers being operative to perform one or more services requested by the clients; and
a Diameter router operatively coupled with the network and comprising:
at least one processor,
a load balancing component implemented using the at least one processor and operative to receive initial Diameter request messages and to relay initial Diameter request messages to a selected server in the network based on at least one routing policy, and
a routing policy component implemented using the at least one processor and operative to select a server of the network for routing of a given initial Diameter request message based at least partially on a type of IMS message session, application services, subscriber information, or billing information,
wherein the router operates as a proxy for a first pair of Diameter messages in a given session, with the remaining Diameter messages for the given session communicated directly between a Diameter client and the selected server.

14. The system of claim 13, further comprising a second router operatively coupled with the network, wherein the routers are operative to access, update, and maintain a shared memory.

15. The system of claim 14, wherein a first one of the routers is configured as a primary Diameter router and wherein a second one of the routers is configured as a secondary Diameter router.

16. The system of claim 13:
wherein the load balancing component is operative to insert a destination host address corresponding to the selected server and a destination realm corresponding to the router into a relayed initial Diameter request message and to send the relayed initial Diameter request message to the selected server;
wherein the selected server is operative to receive the relayed request message, to copy the address of the router into a destination host field of an initial Diameter response message, and to send the Diameter response message to the router;
wherein the router is further operative to receive the initial Diameter response message from the selected server and to send a relayed initial Diameter response message to the requesting client; and
wherein the requesting client is operative to receive the relayed initial Diameter response message, to copy the selected server address from the destination host field of the relayed initial Diameter response message, and to send subsequent Diameter messages for a current session directly to the selected server.

17. The system of claim 13, wherein the routing policy component includes a Diameter reference of points component implemented using the at least one processor and operative to distinguish Diameter Cx, Sh, Rf, Ro, Go, and Gq request messages and to identify suitable host servers in the network capable of providing services associated with the initial Diameter request message, and wherein the routing policy component selects a server for routing a given initial Diameter request message from the identified suitable host servers.

18. The system of claim 13, wherein the routing policy component includes a traffic and load analysis component implemented using the at least one processor and operative to dynamically monitor traffic load and an alive status of the servers, and wherein the routing policy component selects a server for routing a given initial Diameter request message based at least partially on the traffic load and alive status of the servers.

19. The system of claim 13, wherein the routing policy component includes a call session subscriber information component implemented using the at least one processor and operative to identify servers that are associated with a subscriber corresponding to the initial Diameter request message based at least partially on a subscriber UE type, a directory number, a service type, or a charging account type of the initial Diameter request message, and wherein the routing policy component selects a server for routing a given initial Diameter request message from the identified host servers.

20. The system of claim 13, wherein the routing policy component includes a home or visit network component implemented using the at least one processor and operative to determine whether a new call session is from a home or visited network, and wherein the routing policy component selects a server for routing a given initial Diameter request message based at least partially on whether the call session is from a home or visited network.

21. The system of claim 13, wherein the routing policy component includes an accounting information component implemented using the at least one processor and operative to parses accounting information including an IMS Charging ID in received Diameter request messages, and wherein the routing policy component selects a server for routing a given initial Diameter request message based at least partially on whether the accounting information.

22. The system of claim 13, wherein the routing policy component includes a network element types component implemented using the at least one processor and operative to identify a network element type of the requesting client based on the received Diameter request message, and wherein the routing policy component selects a server for routing a given initial Diameter request message based at least partially on the identified network element type.

23. The system of claim 13, wherein the routing policy component includes an application service types component implemented using the at least one processor and operative to identify application and service types from received initial Diameter request messages, and wherein the routing policy component selects a server for routing a given initial Diameter request message based at least partially on identified application and service types.

24. The system of claim 13, wherein the routing policy component is operative to selectively route all Diameter messages of one call or session to the same selected server.

25. The system of claim 13, where the Diameter router is separate from the Diameter clients.

26. A method for routing Diameter messages for a Diameter session in an IMS network, the method comprising:

at a Diameter client, sending an initial Diameter request message to a Diameter router in the IMS network;

at the Diameter router, selecting a server of the network for the initial Diameter request message based at least partially on a type of IMS message session, application services, subscriber information, or billing information, sending a relayed initial Diameter request message to the selected server;

at the Diameter client, sending all subsequent Diameter messages for the Diameter session directly to the selected server; and at the selected server, sending all subsequent Diameter messages for the Diameter session directly to the Diameter client.

27. The method of claim 26, further comprising:

at the Diameter router, inserting a destination host address corresponding to the selected server and a destination realm corresponding to the router into the relayed initial Diameter request message;

at the selected server, receiving the relayed request message, copying the address of the router into a destination host field of an initial Diameter response message, and sending the Diameter response message to the router;

at the router, receiving the initial Diameter response message, and sending a relayed initial Diameter response message to the requesting client; and at the client, receiving the relayed initial Diameter response message, copying the selected server address from the destination host field of the relayed initial Diameter response message, and sending subsequent Diameter messages for a current session directly to the selected server.

28. The method of claim 26, where the Diameter router is separate from the Diameter client.

* * * * *

UNITED STATES PATENT AND TRADEMARK OFFICE
CERTIFICATE OF CORRECTION

| | | |
|---|---|---|
| PATENT NO. | : 8,468,267 B2 | Page 1 of 1 |
| APPLICATION NO. | : 12/744504 | |
| DATED | : June 18, 2013 | |
| INVENTOR(S) | : Yigang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 253 days.

Signed and Sealed this
Twenty-first Day of July, 2015

Michelle K. Lee
*Director of the United States Patent and Trademark Office*